Aug. 1, 1944. W. H. BASELT 2,354,972
CLASP BRAKE
Filed Nov. 21, 1941 3 Sheets-Sheet 1

INVENTOR.
Walter H. Baselt,
BY
att'y.

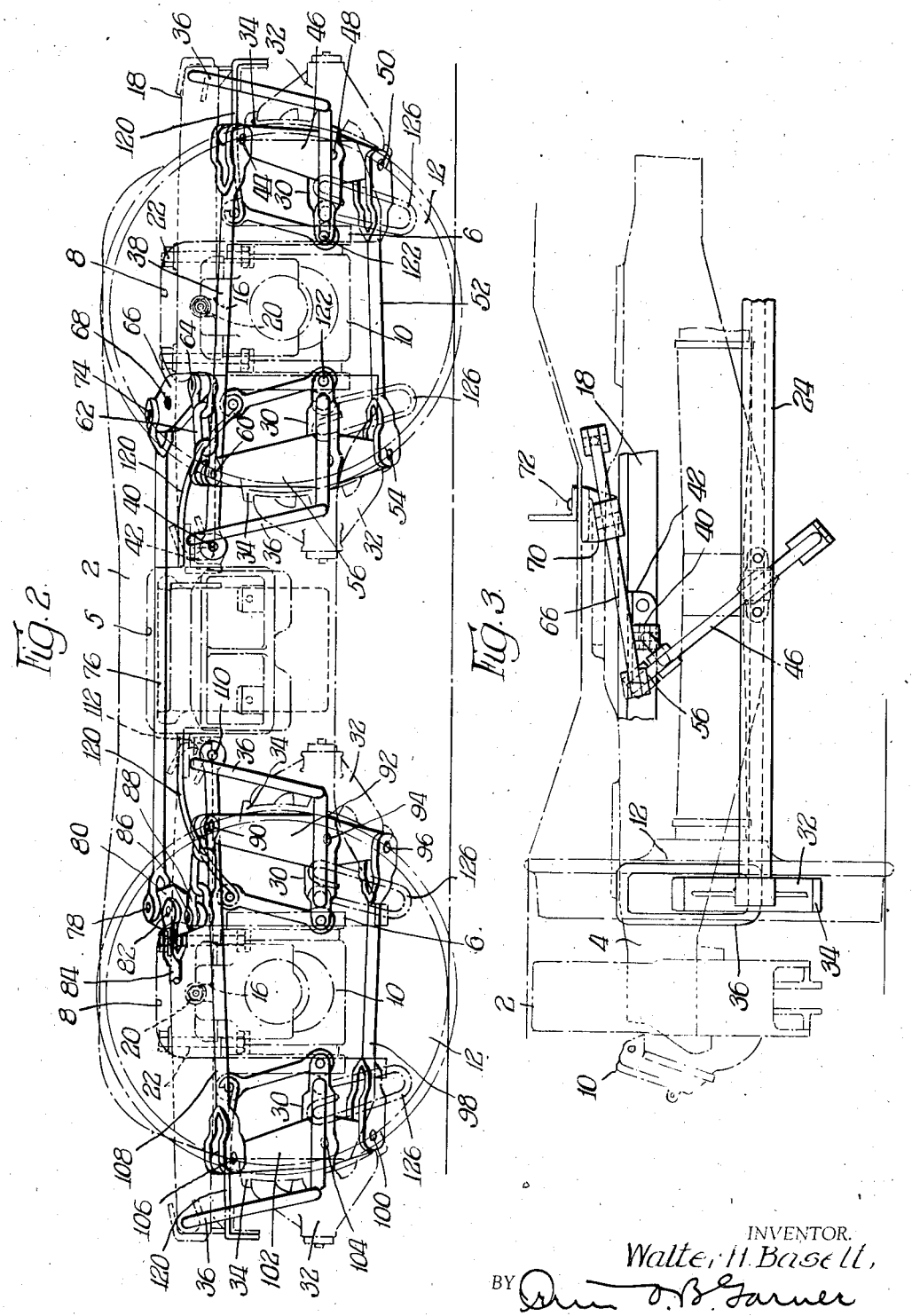

Aug. 1, 1944.  W. H. BASELT  2,354,972
CLASP BRAKE
Filed Nov. 21, 1941  3 Sheets-Sheet 3

INVENTOR
Walter H. Baselt
BY
ATTORNEY

Patented Aug. 1, 1944

2,354,972

UNITED STATES PATENT OFFICE 2,354,972

CLASP BRAKE

Walter H. Baselt, Chicago, Ill., assignor to American Steel Foundries, Chicago, Ill., a corporaton of New Jersey Application November 21, 1941, Serial No. 419,951

16 Claims. (Cl. 188—56)

My invention relates to a brake arrangement for a railway car truck and more particularly to a type of brake arrangement commonly designated clasp brake wherein brake heads and brake shoes are applied at opposite sides of each wheel. Under ordinary conditions, some lateral movement is permitted wheel and axle assemblies in their relation to the truck frames which may be supported thereon, and this relative lateral motion affects to some degree the operation of the brake rigging which ordinarily is supported from the truck frame.

The general object of my invention is to devise a brake arrangement suitable for application to railway car trucks wherein the brake rigging may be so supported as to have lateral movement with the wheel and axle assemblies, thus maintaining the brake shoes substantially in alignment with the wheels at all times regardless of relative lateral motion that may take place between the wheel and axle assemblies and the truck frame supported thereon.

A more specific object of my invention is to devise a brake arrangement which may be supported from the special brake frame more or less independently of the truck frame, each wheel and axle assembly carrying its own brake frame.

My invention also contemplates a clasp brake arrangement wherein a fulcrum from the car body will be associated with the braking means of one wheel and axle assembly, while a body brake connection may be associated with the braking means of the other wheel and axle assembly for actuation of the brakes.

In the drawings, Figure 1 is a top plan view of a railway car truck embodying my invention.

Figure 2 is a side elevation of the truck and brake arrangement shown in Figure 1, and Figure 3 is an end view of the truck and brake arrangement shown in Figures 1 and 2, taken from the right as seen in those figures.

For the sake of simplicity, in each of the figures certain details may be omitted where they are more clearly shown in other views.

Figure 4:
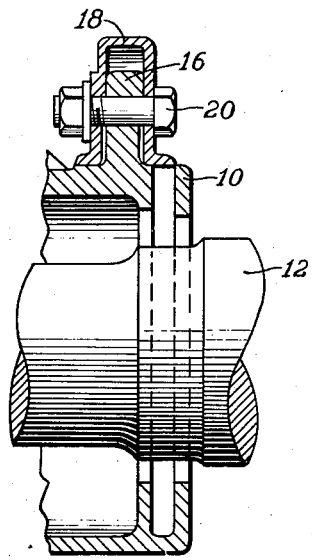
Figures 4 and 5 are sectional fragmentary views taken through one of the truck journal boxes and illustrating the connection thereof to the associated brake frame, Figure 4 being taken in the transverse vertical plane substantially bisecting the box and Figure 5 being taken in a longitudinal vertical plane substantially bisecting the box.
Figure 5:
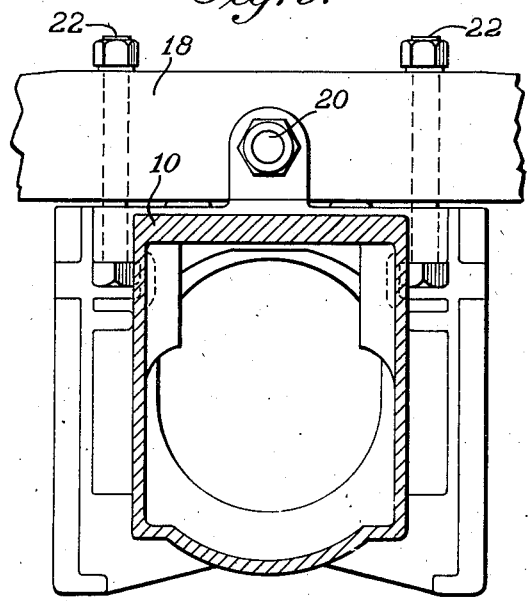

Describing the structure in detail, the truck frame may comprise the usual side members 2, 2 between which may be connected in usual manner a bolster 4, each end of which may be received in a bolster opening 5 of the adjacent side frame. Each side member has at its opposite ends pedestal jaws 6, 6 defining pedestal openings 8, 8 for connection in usual manner to journal boxes 10, 10 at opposite ends of each wheel and axle assembly 12. In the arrangement shown, each journal box has guiding engagement within the adjacent pedesal jaws 6, 6 and at its inboard end each journal box 10 has a centrally positioned upstanding lug 16 which may project upwardly affording securing means for the superposed brake frame generally designated 18 between the inboard and outboard webs or flanges of the inverted U-section thereof. The brake frame 18 appears in plan as a generally rectangular frame, the opposite ends of which may be supported on journal boxes 10, 10 on respective ends of each wheel and axle assembly. As best seen in Figure 4, the end of each brake frame may be of inverted U-section between the inboard and outboard webs of which may project the before-mentioned lug 16, said lug being secured to said frame as by the transverse nut and bolt assembly 20, and said frame may be further secured to the adjacent journal box by means of vertical bolt and nut assemblies 22, 22 (Figure 5) secured at the inboard edge of each box adjacent opposite sides thereof. By this means the brake frame 18 is firmly fixed to the journal boxes at opposite sides of each supporting wheel and axle assembly.

Figure 1:
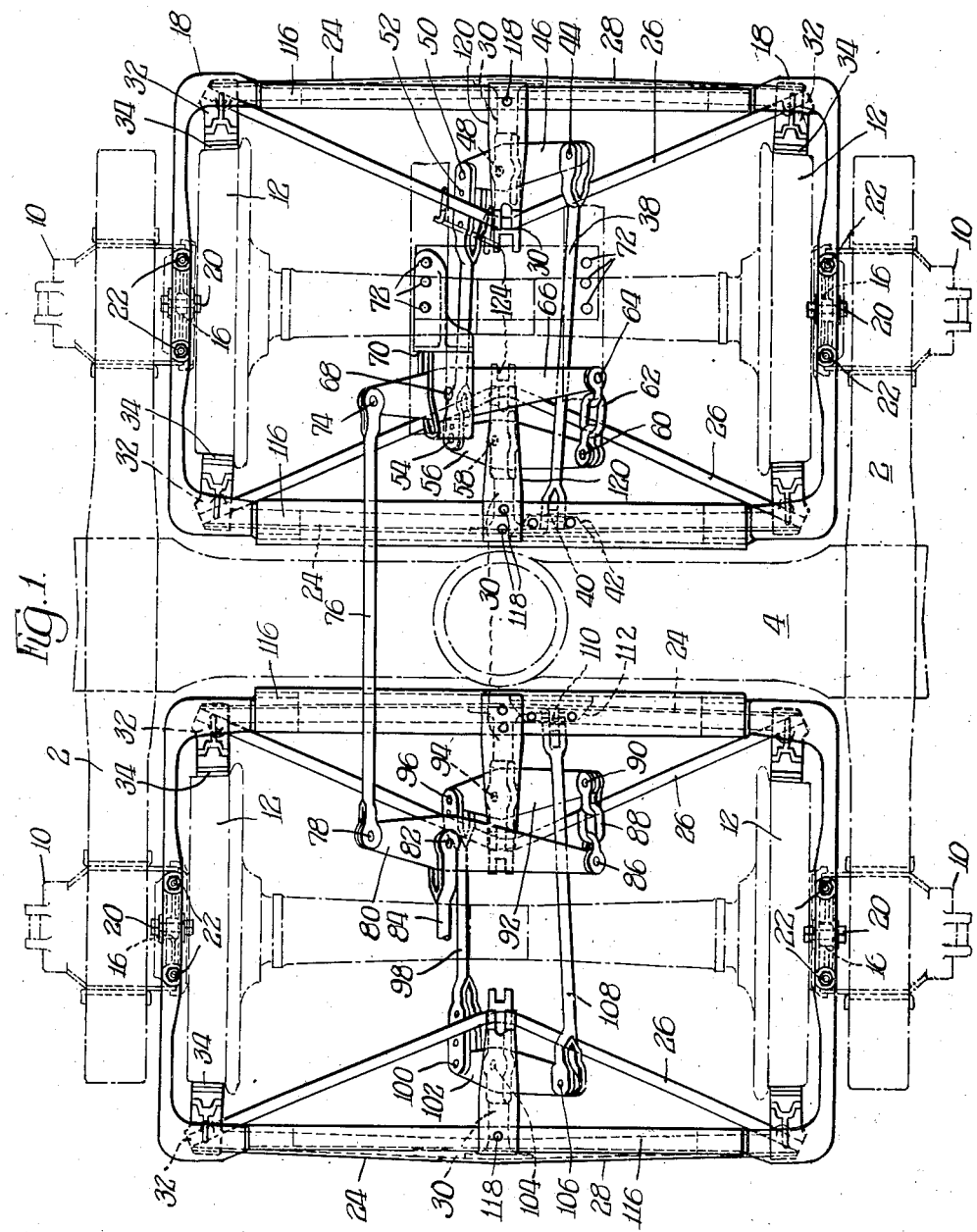

My novel brake arrangement may comprise truss type brake beams 24, 24 supported at opposite sides of each wheel and axle assembly, each brake beam comprising a tension member 26, a compression member 28, and a strut 30. Brake heads 32, 32 with associated friction shoes 34, 34 are supported at the ends of said beams, said shoes being arranged for engagement with the periphery of the adjacent wheels. Each brake beam 24 may be supported from opposite corners of the adjacent brake frame 18 by means of the hangers 36, 36, the upper ends of which may have pivotal connection adjacent the corners of said frame, and the lower ends of which may have pivotal connection with the adjacent brake heads in the usual manner. The brake rigging also comprises the pull rod 38 (Figure 1, right) which may be pivotally connected at its inner end as at 40 from the bracket 42 fixed on the side of the adjacent brake frame 18. The opposite end of the pull rod 38 may have pivotal and adjustable connection as at 44 with the dead truck lever 46, and an intermediate point of said lever 46 may be pivotally connected as at 48 in the strut 30 of the adjacent beam. The opposite end of the dead lever 46 may have pivotal and adjustable connection as at 50 to the jaw end of the pull rod 52 which may extend below the axle of the adjacent wheel and axle assembly and have pivotal connection at the opposite end thereof as at 54 with the live brake lever 56. The lever 56 may be pivotally connected intermediate its ends as at 58 in the strut 30 of the adjacent beam, and its opposite end may have pivotal connection as at 60 with the link and clevis means 62, the opposite end of which may have pivotal connection as at 64 to the dead operating lever 66. The dead lever 66 may be fulcrumed intermediate its ends as at 68 from the bracket 70 fixed as at 72, 72 to the center sill of the superposed car body, a fragmentary portion of which is shown in Figure 1. The opposite end of the dead lever 66 may have pivotal connection as at 74 with the pull rod 76 which may extend over the bolster 4 for pivotal connection at its opposite end as at 78 with the operating lever 80, said operating lever having a point intermediate its ends pivotally connected as at 82 to the operating rod 84, and the opposite end of said rod may have connection in any convenient manner to the body brake (not shown). The opposite end of the operating lever 80 may have pivotal connection as at 86 to the link and clevis means 88, the opposite end of which may have pivotal connection as at 90 to the live truck lever 92. The live truck lever 92 may be connected intermediate its ends as at 94 in the strut or fulcrum of the adjacent beam 24, and its opposite end may have pivotal and adjustable connection as at 96 to one end of the pull rod 98. The pull rod 98 may extend below the adjacent axle and the opposite end thereof may have pivotal and adjustable connection as at 100 to the dead brake lever 102 which may be fulcrumed intermediate its ends as at 104 in the strut of the adjacent beam 24, and its opposite end may have pivotal and adjustable connection as at 106 to the pull rod 108 which may extend above the adjacent axle and have its opposite end connected as at 110 to the bracket 112 fixed on the side of the adjacent brake frame 18.

Each brake frame 18 may comprise side members 116, 116 each of which may support centrally thereof as at 118 balance and safety means 120 of usual form and connected as at 122 to a jaw 124 formed on the strut 30 of the adjacent brake beam 24. Further safety means for the brake rigging may be provided in the form of hangers 126, 126 supported from the beams 24, 24 and underlying the pull rods 52 and 98 respectively. In operation, power means (not shown) mounted on the associated car body will actuate the operating rod 84 (Figure 1, left) moving said rod to the left and supplying movement of translation to the operating lever 80. Said movement of the operating lever 80 will operate the brakes associated with the adjacent wheel and axle assembly through the pull rod 98, and said movement of the operating lever 90 will cause the pull rod 76 to move to the left, thus actuating the brake rigging at the opposite end of the truck through the dead lever 66 as will be clearly apparent to those skilled in the art.

In my novel arrangement, the brake frame 18 at each end of the truck is supported on journal boxes 10, 10 at opposite ends of the adjacent wheel and axle assembly, and said wheel and axle assembly with its associated journal boxes is permitted lateral movement with respect to the adjacent truck frame which may be supported thereon. The connection of the brake frame between the journal boxes at opposite sides of each assembly permits the brake rigging to follow the lateral movements of the wheel and axle assembly, thus affording close alignment of the brake heads and brake shoes with the peripheries of the associated wheels.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a brake arrangement for a railway car truck, a car body supported thereon, supporting wheel and axle assemblies, journal boxes associated with each assembly, brake frames mounted on the journal boxes of respective assemblies, and brake rigging comprising hangers hung from said brake frames and supporting brake beams at opposite sides of each assembly, live and dead truck levers associated with the beams at respective sides of each assembly, said dead levers being fulcrumed from said brake frames, pull rods connecting the live and dead levers associated with each assembly, operating levers associated with the respective assemblies and connected to the live truck levers thereof, a pull rod connecting said operating levers, one of said operating levers being fulcrumed intermediate its ends from said car body, and means for actuating the other of said operating levers.

2. In a brake arrangement for a railway car truck, a car body supported thereon, supporting wheel and axle assemblies, journal boxes associated with each assembly, brake frames mounted on the journal boxes of respective assemblies, and brake rigging comprising hangers hung from said brake frames and supporting brake beams at opposite sides of each assembly, live and dead truck levers associated with the beams at respective sides of each assembly, said dead levers being fulcrumed from said brake frames, pull rods connecting the live and dead levers associated with each assembly, operating levers associated with the respective assemblies and connected to the live truck levers thereof, and a pull rod connecting corresponding ends of said operating levers.

3. In a brake arrangement, a vehicle frame, a car body mounted thereon, spaced supporting wheel and axle assemblies, journal boxes associated therewith, a brake frame supported on the journal boxes associated with each assembly, brake beams hung from each brake frame at opposite sides of the associated assembly, interconnected live and dead truck levers fulcrumed from respective beams associated with each assembly, the dead truck levers being connected to said brake frames, and operating means associated with the live truck levers, said operating means comprising interconnected live and dead operating levers, the dead operating lever being fulcrumed from the car body, and an operative connection between each operating lever and the adjacent live truck lever.

4. In a brake arrangement, a vehicle frame, spaced supporting wheel and axle assemblies, journal boxes associated therewith, a brake frame supported on the journal boxes associated with each assembly, brake beams hung from each brake frame at opposite sides of the associated assembly, interconnected live and dead truck levers fulcrumed in respective beams associated with each assembly, the dead truck levers being fulcrumed from said brake frames, and operating means associated with the live truck levers, said operating means comprising interconnected live and dead operating levers disposed intermediate the sides of said vehicle frame, and an operative connection between each operating lever and the adjacent live truck lever.

5. In a brake arrangement for a railway car truck, a car body supported thereon, supporting wheel and axle assemblies, journal boxes associated with each assembly, brake frames mounted on the journal boxes of respective assemblies, and brake rigging comprising brake beams supported at opposite sides of each assembly, interconnected live and dead truck levers associated with respective beams, said dead levers being fulcrumed from said brake frames, and operating means comprising interconnected operating levers positioned substantially intermediate the sides of said truck and connected to said live levers.

6. In a brake arrangement, a vehicle frame, spaced supporting wheel and axle assemblies, journal boxes associated therewith, brake frames supported on the journal boxes associated with the respective assemblies, brake rigging comprising brake beams hung from said brake frames at opposite sides of each assembly, live truck levers fulcrumed in the beams intermediate said assemblies, dead truck levers fulcrumed in the beams outwardly of said assemblies, said dead truck levers being connected to the associated brake frames, and operating means associated with the live truck levers, said operating means comprising interconnected live and dead operating levers disposed intermediate the sides of said vehicle frame, and an operative connection between each of said operating levers and the adjacent live truck lever.

7. In a brake arrangement, a truck, a car body mounted thereon, spaced supporting wheel and axle assemblies, brake beams supported at opposite sides of each assembly, live and dead truck levers fulcrumed in the beams associated with each assembly, brake frames afforded an unsprung support from said assemblies, said dead truck levers being connected to respective frames, and actuating means comprising interconnected live and dead operating levers connected to respective live truck levers, said dead operating lever being fulcrumed from the car body.

8. In a brake arrangement, a truck, spaced supporting wheel and axle assemblies, brake beams supported at opposite sides of each assembly, rigid brake support means supported from said assemblies, live and dead truck levers fulcrumed in the beams associated with each assembly, over-axle pull rods connecting respective dead truck levers to the associated brake support means, and actuating means comprising interconnected live and dead operating levers positioned substantially intermediate the sides of said truck and connected to respective live truck levers.

9. In a brake arrangement, a wheel and axle assembly, a journal box associated therewith, and braking means comprising live and dead levers at opposite sides of said assembly, means supported by said box, an over-axle pull rod connected to the last-mentioned means and affording a fulcrum for said dead lever, a connection between said levers, and an operating lever fulcrumed from an associated car body intermediate the ends of said assembly and connected to the live lever.

10. In a brake arrangement, a truck, spaced supporting wheel and axle assemblies, brake support means afforded an unsprung support from said assemblies, brake beams supported at opposite sides of each assembly, live and dead truck levers fulcrumed in the beams associated with each assembly, over-axle pull rods connecting respective of said dead truck levers to said brake support means, and actuating means comprising live and dead operating levers connected at corresponding ends to each other and connected at opposite corresponding ends to respective live truck levers.

11. In a brake arrangement, a truck, spaced supporting wheel and axle assemblies, brake support means afforded an unsprung support from said assemblies, brake beams supported at opposite sides of each assembly, live and dead truck levers fulcrumed in the beams associated with each assembly, pull rods extending transversely of said assemblies and connecting respective of said dead truck levers to the associated brake support means, and actuating means comprising live and dead operating levers connected at corresponding ends to each other and connected at opposite corresponding ends to respective live truck levers, the connection between said live and dead operating levers consisting of a pull rod overlying a transverse portion of said truck and connected at opposite ends thereof to said operating levers.

12. In a brake arrangement, a truck comprising spaced side frames and an interposed bolster, a car body mounted on the truck, spaced supporting wheel and axle assemblies, brake support means afforded an unsprung support from respective assemblies, brake beams at opposite sides of said assembly, live and dead truck levers fulcrumed in respective beams associated with each assembly, pull rods extending transversely of respective assemblies and connecting respective of said dead truck levers to the associated of said brake support means, live and dead operating levers, said dead operating lever being fulcrumed from the car body, a pull rod extending over the bolster and connecting said operating levers, and an operative connection between each operating lever and one of the live truck levers.

13. In a brake arrangement, a truck comprising spaced side frames and an interposed bolster, a car body mounted on the truck, spaced supporting wheel and axle assemblies, a brake frame afforded an unsprung support from each assembly, brake beams at opposite sides of said assembly, live and dead truck levers fulcrumed in respective beams associated with each assembly, over-axle pull rods connecting respective of said dead truck levers to the associated brake frames, live and dead operating levers, said dead operating lever being fulcrumed intermediate its ends from the car body, a pull rod extending over the bolster and connecting said operating levers, and an operative connection between each operating lever and one of the live truck levers.

14. In a brake arrangement, a truck, a car body mounted thereon, spaced supporting wheel and axle assemblies, journal boxes associated therewith, a brake frame hung on the journal boxes associated with each assembly, brake beams supported at opposite sides of each assembly from the associated brake frame, live and dead truck levers fulcrumed in the beams associated with each assembly, said dead truck levers being connected to the associated brake frames, and actuating means comprising interconnected live and dead operating levers connected to respective live truck levers, said dead operating levers being fulcrumed from the car body.

15. In a brake arrangement, a truck, a car body mounted thereon, spaced supporting wheel and axle assemblies, journal boxes associated therewith, a brake frame hung on the journal boxes associated with each assembly, brake beams supported at opposite sides of each assembly from the associated brake frame, live and dead truck levers fulcrumed in the beams associated with each assembly, over-axle pull rods connecting respective dead truck levers to the associated brake frames, and actuating means comprising interconnected live and dead operating levers connected to respective live truck levers, said dead operating lever being fulcrumed from the car body, the connection between the live and dead operating levers consisting of a pull rod overlying a transverse portion of the truck and connected to said operating levers.

16. In a brake arrangement, a truck, spaced supporting wheel and axle assemblies, journal boxes associated therewith, a brake frame supported from the journal boxes associated with each assembly, brake beams supported at opposite sides of each assembly from the associated brake frame, live and dead truck levers fulcrumed in the beams associated with each assembly, a pull rod connected to each dead truck lever, extending transversely of the associated assembly, and connected to the associated brake frame, and actuating means comprising interconnected live and dead operating levers positioned substantially intermediate the sides of said truck and connected to respective live truck levers.

WALTER H. BASELT.